May 9, 1939.　　　R. S. DYSON　　　2,157,283
ENDLESS CARRIER OR CONVEYER CHAIN
Filed April 12, 1937　　　3 Sheets-Sheet 1

Inventor
Ralph S. Dyson

By L. Donald Myers
Attorney

May 9, 1939.  R. S. DYSON  2,157,283
ENDLESS CARRIER OR CONVEYER CHAIN
Filed April 12, 1937  3 Sheets-Sheet 2
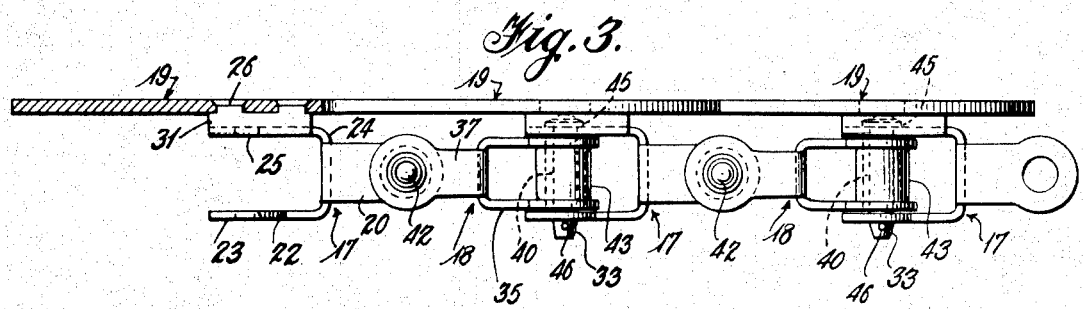
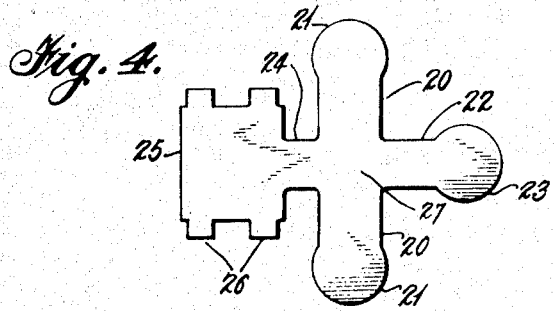
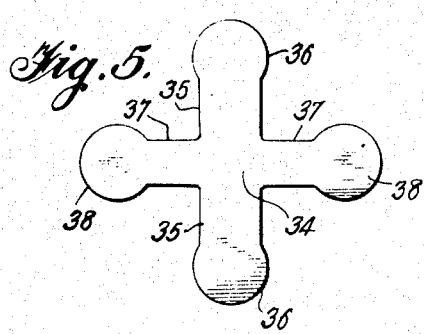
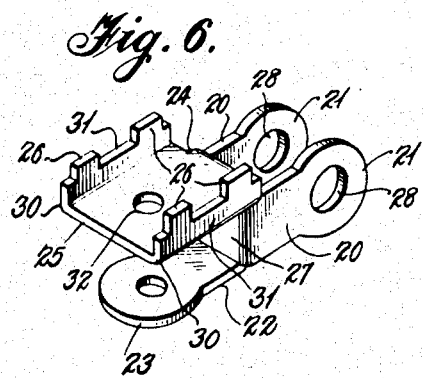
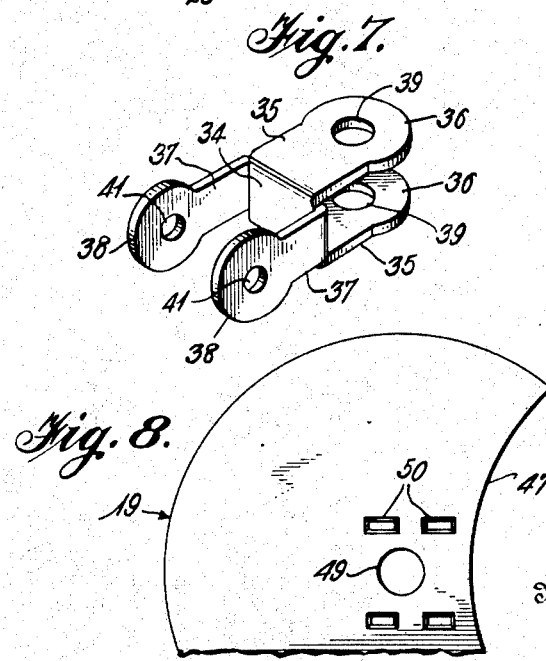
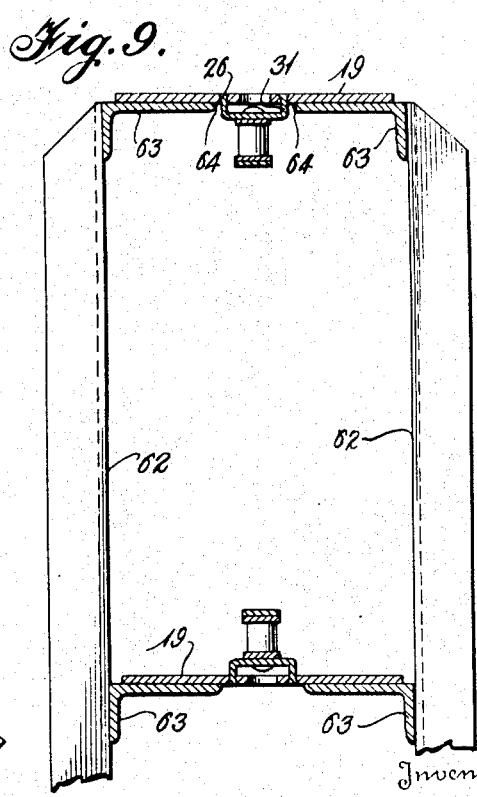
Inventor
Ralph S. Dyson
By L. Donald Magus
Attorney Inventor
Ralph S. Dyson Patented May 9, 1939

2,157,283

UNITED STATES PATENT OFFICE 2,157,283

ENDLESS CARRIER OR CONVEYER CHAIN

Ralph S. Dyson, Indianapolis, Ind., assignor to Link-Belt Company, a corporation of Illinois Application April 12, 1937, Serial No. 136,478

18 Claims. (Cl. 198—182)

This invention relates to new and useful improvements in endless carrier or conveyer chains.

The primary object of the invention is to provide an endless carrier or conveyer chain which is capable of traveling around bends or corners when moving in a single horizontal plane and providing a continuous, uninterrupted, carrying surface and which is capable of returning through a path parallel to and underlying the carrying run.

A further important object of the invention is to provide a carrier or conveyer chain which is capable of bending around and meshing with the teeth of sprockets arrranged at right angles to each other.

Still another object of the invention is to provide means for preventing tilting, sagging, or lateral displacement of the carrying run of a conveyer chain of the above mentioned type.

Another object of the invention is to provide a carrier or conveyer chain which is capable of traveling through a plurality of angularly arranged planes and which may be reversibly driven in opposite directions.

A still further object of the invention is to rigidly attach the top plates of the conveyer to links of the chain in such a manner that each plate-carrying link will be directly engaged by teeth of each sprocket; that each plate will pivot about its own axis while traveling around a bend or corner in the carrying run of the conveyer; that the plates will pivot about axes arranged midway between the axes of adjacent plates while traveling around sprockets having horizontal axes; and that the engagement between the teeth of all of the sprockets and the chain will occur in the center line of the chain.

Other objects and advantages of the invention will be apparent during the course of the following description.

In the accompanying drawings forming a part of this specification and in which like numerals are employed to designate like parts throughout the same;

Figure 3 is a side elevational view of a short section of the chain illustrated in Figure 1;

Figure 4 is a detail plan view of a blank of the type from which the top plate links are formed;

Figure 5 is a detail plan view of a blank of the type from which the connector links are formed;

Figure 6 is a perspective view of a top plate link formed from the blank shown in Figure 4;

Figure 7 is a perspective view of a connector link formed from the blank illustrated in Figure 5;

Figure 8 is a fragmentary top plan view of one carrier plate and illustrates the countersunk formation of the apertures formed in a top plate for receiving the lugs of a top plate link, which lugs are riveted to rigidly secure the plate to its respective link;

Figure 9 is a vertical sectional view through the top and bottom runs and illustrates the manner in which the said runs are supported by tracks while traveling through straight paths;

Figure 1:
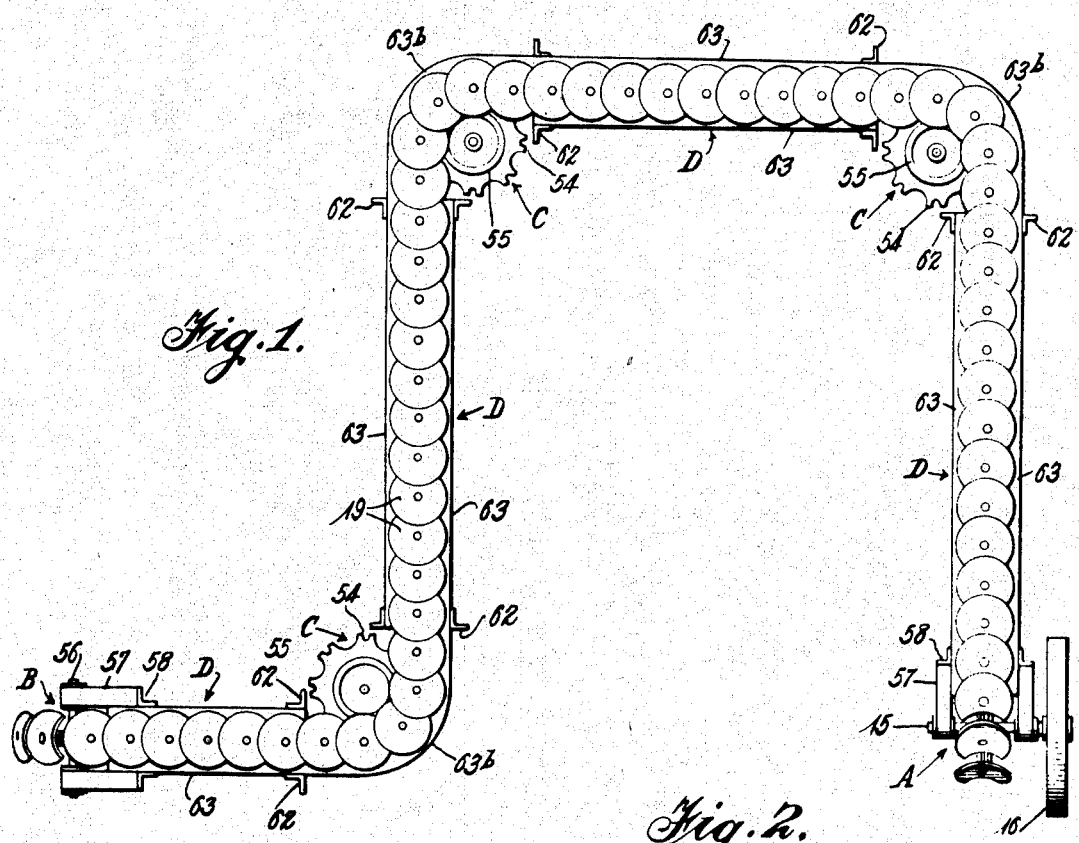
Figure 1 is a top plan view of a carrier or conveyer chain embodying this invention.

In the drawings, wherein for the purpose of illustration is shown the preferred embodiment of this invention, and particularly referring to Figure 1, the carrier or conveyer chain embodying this invention is illustrated as traveling around the end sprockets A and B, which rotate about horizontal axes, for changing from the top run to the bottom run of the chain. Bend or corner defining sprockets C are located at suitable points throughout the length of the travel or path of the conveyer chain for the purpose of causing the conveyer to change its direction of travel while remaining in a single horizontal plane. In the stretches between the various sprockets A, B, and C, the chain is adapted to travel through straight paths in both its top and bottom runs. In the particular installation disclosed in Figure 1, the end sprocket A is mounted on a shaft 15 which is driven through the medium of the pulley 16. It is to be understood, of course, that a sprocket wheel or a gear may be substituted for the pulley 16 to provide a suitable drive for the entire conveyer or carrier chain. As will be developed at a later point, the conveyer chain and the various sprockets are so constructed and arranged that the conveyer chain may be reversibly driven in either direction without necessitating modification of the assembly in any respect.

Figure 2:
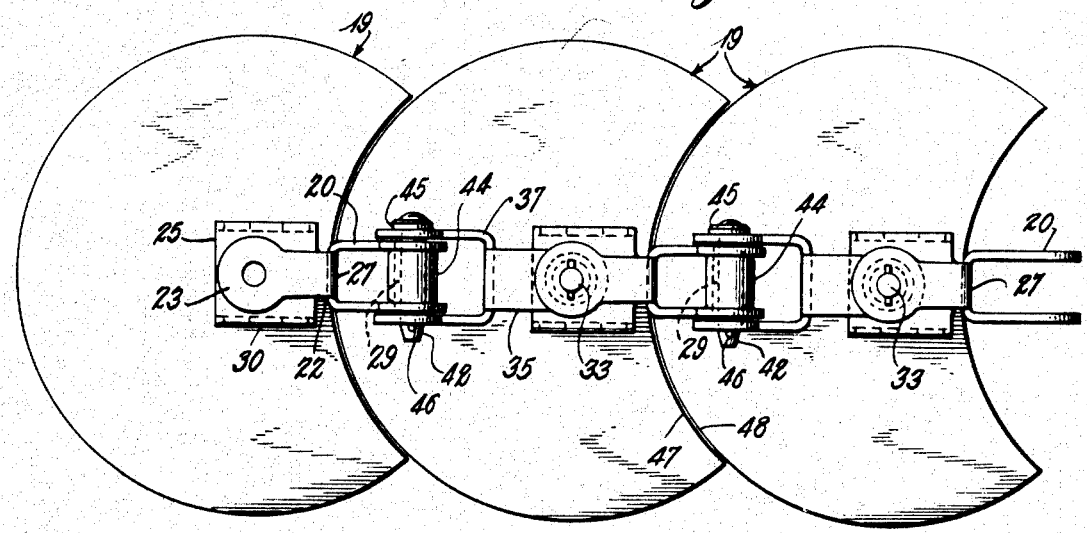
Figure 2 is a bottom plan view of a short section of the chain illustrated in Figure 1.

Referring particularly to Figures 2 and 3 of the drawings, it will be seen that the carrier or conveyer chain embodying this invention is formed of a suitable number of top plane links 17 which are properly spaced and interconnected by connector links 18. Each top plane link 17 has rigidly secured thereto a top carrier plate 19.

Figures 4 and 6 disclose, respectively, a blank and a top plate link which has been formed from said blank. The blank of Figure 4 has been stamped from suitable sheet material, of proper gauge, and consists of the aligned arms 20 with the enlarged heads or extremities 21, the right-angularly arranged arm 22 with its enlarged head or extremity 23, and the arm 24, which is aligned with the arm 22, and its enlarged head or extremity 25. The enlarged heads or extremities 21 and 23 are of substantially circular formation. The enlarged head or extremity 25, however, is of substantially rectangular formation in plan and is provided at each of its side edges with a pair of lugs 26. The various arms 20, 22, and 24 are joined by the central or web portion 27.

This blank of Figure 4 is properly bent to form the top plate link of Figure 6 after suitable chain pin receiving apertures have been formed in the enlargements or extremities of the various arms. The two arms 20 are bent relative to the central or web portion 27 until they lie in parallelism with each other and at right angles to the web portion. Comparatively large apertures 28 are formed in the heads or extremities 21 of the two arms 20. These apertures 28 are arranged in axial alignment with each other and are adapted to have suitably secured therein the bushings 29 shown in Figure 2. The arms 22 and 24 are bent in the opposite directions from the arms 20. The arms 22 and 24 are arranged in parallelism and at right angles to the central web 27. Due to the difference in length of the arms 22 and 24, the rectangularly shaped head or enlargement 25 of the arm 24 will partially lie in parallelism with a portion of the arm 22. This head or enlargement 25 is bent along the lines 30 to form two parallel, upstanding, side flanges 31 above which project the previously referred to pairs of lugs 26. Axially aligned, relatively small apertures 32 are formed in the heads or enlargements 23 and 25 and receive chain pin 33, as best shown in Figure 3.

Figures 5 and 7 disclose, respectively, a blank and a connector link shaped from the blank. Figure 5 discloses this blank as including a central web portion 34, two opposed arms 35 with circular heads or enlargements 36, and two opposed arms 37 with heads or enlargements 38 of substantially circular formation. It will be noted that the arms 35 are arranged at right angles to the arms 37.

The arms 35 are bent into parallelism at right angles to the central web 34. The heads or enlargements 36 of the arms 35 are suitably formed with comparatively large apertures 39 to have rigidly mounted therein the bushings 40, best illustrated in Figure 3. The remaining arms 37 are bent at right angles to the central web 34 and into parallelism. The arms 37 extend from the central web 34 in the opposite direction to that of the arms 35. Comparatively small, axially aligned apertures 41 are formed in the heads or enlargements 38 for receiving the chain pins 42 which are disclosed in Figure 2 as extending through the bushings 29. Figure 3 discloses the bushings 40, carried by the arms 35, as pivotally receiving the pins 33, previously referred to as being received within the apertures 32 formed in the enlarged heads 23 and 25 of the top plate links 17.

By carefully inspecting Figures 2, 3, 6, and 7, it will be seen that each one of the links 17 and 18 is made up of two pairs of oppositely extending arms with heads or enlargements and that each pair of arms cooperates with a central web portion to form a substantially U-shaped link part. The pins 33 and 42 connect the various links 17 and 18 into an endless chain structure which is capable of traveling around sprockets positioned with their axes arranged at right angles to each other. In other words, the chain pins 33 and 42 join the various links 17 and 18 so that the chain is capable of traveling around the various sprockets A, B, and C, shown in Figure 1.

The chain assembly is completed by the provision of sprocket teeth engaging rollers 43, mounted on the bushings 40, and sprocket teeth engaging rollers 44, mounted on the bushings 29. Each one of the chain pins 33 and 42 is provided at one end with a washer 45 and at its opposite end with a cotter 46. These washers 45 and cotters 46 maintain the various pins in assembled relation with respect to the links joined together by the same.

Referring particularly to Figures 2 and 8, it will be seen that each one of the top carrier plates 19 is of substantially disc form and provided with a peripheral recess 47 adapted to receive the curved or convex edge portion 48 of an adjoining plate. Figure 8 discloses the axis of a plate 19 as having an aperture or opening 49 formed therein. This aperture or opening is of proper size to permit a cotter pin 33 with its end washer 45 to be passed therethrough for being inserted through the apertures 32 of a top plate link 17 and a bushing 40 carried by a connector link 18. Properly grouped around the central aperture 47 of each top plate 19 are four elongated openings 50 which are so arranged relative to each other as to receive the four upstanding lugs 26 of a top plate link 17. These elongated openings 50 are countersunk at their upper ends to permit the lugs 26 to be peened over or riveted to rigidly anchor a top plate to a plate link. The peening over of the lugs 26 into the countersunk end portions of the openings 50 prevents the lugs 26 from projecting above the top surface of their respective top plates 19. The riveted lugs 26, therefore, provide a smoother surface to cooperate with the top surface of their respective top plates.

By inspecting Figures 2 and 3, it will be seen that each one of the top plates 19 is rigidly connected to a top plate link 17 which has operatively attached thereto two right-angularly arranged chain pins 33 and 42. These chain pins, through their surrounding bushings and rollers, are to be engaged by the teeth of sprocket wheels A, B, and C. Each top plate link 17, with its rigidly attached top plate 19, directly engages teeth of all of the sprocket wheels. The chain pins 33 permit the conveyer chain to travel or bend around sprockets mounted on vertical axes. As these pins 33 are concentrically arranged with the axes of the various top plates 19, these top plates will swing around their axes while traveling around sprockets having vertical axes. The pitch for the pins 33 is equal to the pitch for the pins 42, and the pins 42 are located midway between the pins 33. It will be appreciated, therefore, that adjacent top plates 19 will pivot about axes located midway between the axes of adjacent plates when the chain travels around the end sprockets A and B to change from the top to the bottom run of the conveyer, or vice versa.

Figure 10:
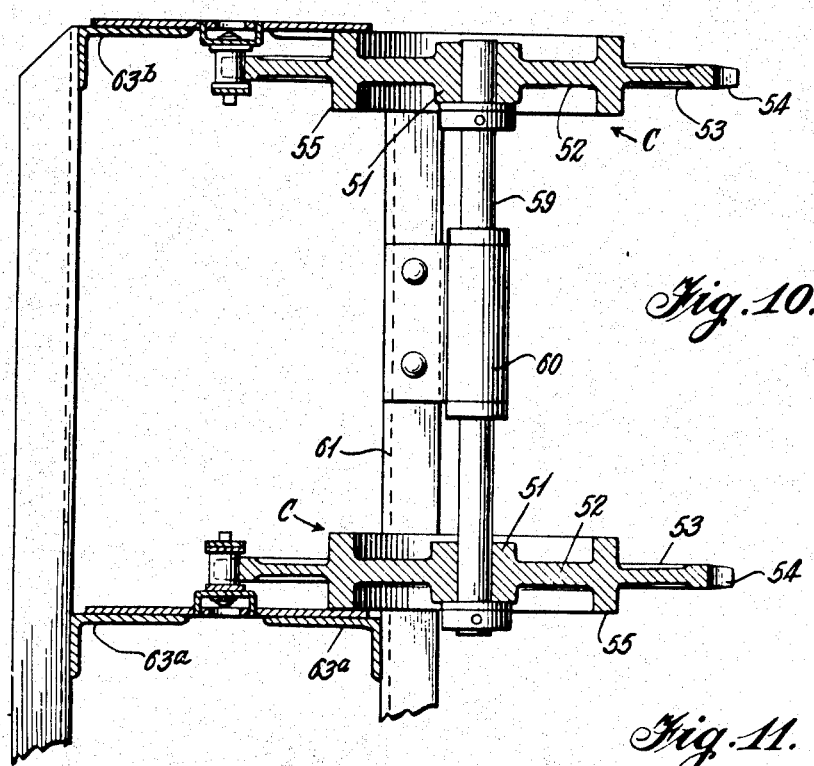
Figure 10 is a vertical sectional view taken through both runs of the conveyer chain at one of the corner defining sprockets.
Figure 11:
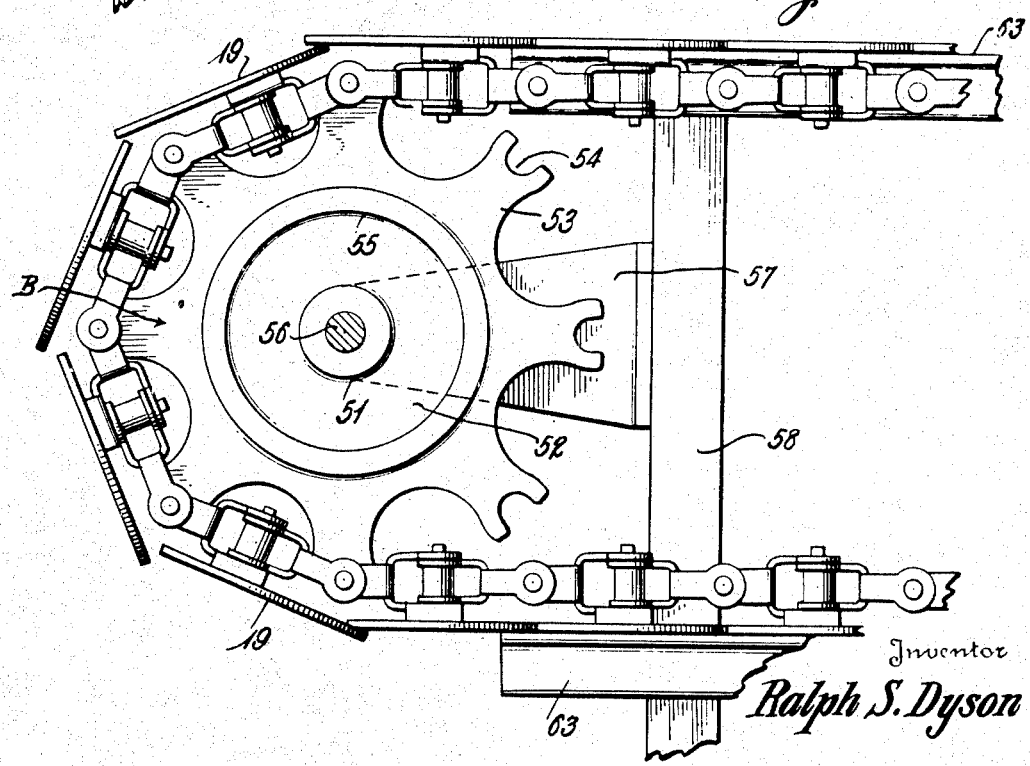
Figure 11 is a side elevational view of the chain bending around one of the end sprockets which is mounted for rotation about a horizontal axis.

All of the sprockets A, B, and C are of identical construction for the purpose of simplifying manufacture of the same and their assembly in a conveyer or carrier system. Figures 10 and 11 very clearly disclose the construction of the sprockets. It will be noted that each sprocket is formed with a suitable hub portion 51 radially of which extends a solid disc-like web or main body portion 52. Formed integrally with the periphery of the web portion 52 are the arms 53 which are forked or bifurcated at their outer ends to form the sprocket teeth 54. These teeth 54 are properly spaced to provide a pitch corresponding with the pitch of the pins 33 and 42. The engagement of the sprocket teeth 54 with the pins 33 or 42 will depend, of course, on the mounting of any particular sprocket. Each sprocket web or body portion 52 is provided with an axially extending, circular rib or flange 55 on each face thereof. These ribs or flanges 55 are concentrically arranged with respect to the pitch line of the sprocket teeth 54.

Figure 11 discloses the sprocket B which is supported by the horizontally extending shaft 56 journaled in the bracket arms 57 which are carried by vertical posts 58. It is to be understood that the sprocket A is supported in the same manner as the sprocket B. The only difference between the two assemblies is that the horizontal shaft 15 for the sprocket A is provided with a driven element 16.

At each bend or corner in the carrier or conveyer system, a vertically extending shaft 59 is provided and is journaled in a suitable bearing 60 mounted on a vertical post 61. The upper and lower ends of the shaft 59 have suitably mounted thereon one of the sprockets C. These sprockets C are provided in duplicate to take care of the upper and lower runs of the conveyer.

The teeth 54 for the end sprockets A and B engage the rollers 44 of the conveyer chain. The teeth 54 for the various sprockets C engage the rollers 43 of the conveyer chain. Due to the fact that the teeth 54 of the various sprockets straddle the rollers 43 and 44, the forked sides or furcations of each one of the teeth are engaged at their opposite sides by the arms of the various links. For example, the teeth 54 for the sprockets A and B engage between the arms 20 of the top plate link 17. The forked teeth 54 for the sprockets C engage the inner faces of the arms 35 which form a part of the connector link 18. This type of engagement between the various sprocket teeth and the arms of the various links operates to a limited extent to prevent movement of the conveyer chain axially of the various sprockets. It also functions to prevent tilting of the top run of the chain relative to the top sprocket C.

Figures 1, 9, 10, and 11 illustrate track mechanism for supporting the carrier or conveyer chain while traveling in both the upper and the lower runs. Figure 9 discloses the supporting mechanism for the upper and lower runs while traveling through the straight paths D. This mechanism includes a suitable number of properly spaced vertical posts 62 which have mounted thereon, to extend transversely thereof, the angle-iron members 63. These angle-iron track members are arranged in vertically spaced pairs, and the horizontally extending flange portions of the various track members are of greater width than the vertically extending flange portions. In the lower run of the chain, the top surfaces of the various top carrying plates 19 merely slidably rest upon the top flanges of the bottom pair of track members 63.

For the top run of the conveyer, the horizontally extending flange portions of the tracks 63 terminate short of each other to a sufficient extent to provide a slot or passageway for the reception of the conveyer chain. The inner edges 64 of these upper track members cooperate with the upwardly extending flanges 31 of the top plate link 17 to prevent lateral displacement of the conveyer chain during its travel through the upper run of the assembly. The top flanges of these upper track members 63, of course, prevent tilting of the top carrying plates 19 should they be overloaded on one side or the other of the center line of the chain. Of course, both the upper and lower pairs of track members 63 prevent sagging of the conveyer chain in both runs of the system.

At the corners defined by the intermediate sprockets C, a pair of curved track members 63a is provided for the lower run of the conveyer. For the upper run of the conveyer, a curved track member 63b is provided for the outside of the turn. The upstanding flange or rib 55 for the upper sprocket C functions as a support for the inner sides of the top carrier plates 19.

It is to be understood that the form of this invention herewith shown and described is to be taken as a preferred example of the same and that various changes in the shape, size, and arrangement of parts may be resorted to without departing from the spirit of the invention or the scope of the subjoined claims.

Having thus described the invention, I claim:

1. In an endless conveyer, a chain formed of a plurality of top plate links interconnected by connector links, the pivots at the opposite ends of each link being arranged at right angles to each other, each of said top plate links having a pair of upstanding flanges, a top carrier plate mounted on each pair of flanges, sprockets mounted to rotate about vertical and horizontal axes engageable with the chain to support the latter in both the upper and lower runs thereof and for bending the said runs around corners, and track members for supporting the upper and lower runs of the chain while traveling between sprockets, said track members for the upper run cooperating with the upstanding flanges of said top plate links for preventing lateral movement of the conveyer.

2. In an endless conveyer, a chain formed of a plurality of top plate links interconnected by connector links, the pivots at the opposite ends of each link being arranged at right angles to each other, each of said top plate links having a pair of upstanding flanges, a top carrier plate mounted on each pair of flanges, and sprockets mounted to rotate about vertical and horizontal axes and having teeth engageable with the chain to define upper and lower runs and bends or corners in said runs, said sprockets which define bends or corners in the upper run each having axially projecting means for supporting said top carrier plates against tilting while traveling around the same.

3. In an endless conveyer, a chain formed of a plurality of top plate links interconnected by connector links, the pivots at the opposite ends of each link being arranged at right angles to each other, each of said top plate links having a pair of upstanding flanges, a top carrier plate mounted on each pair of flanges, sprockets mounted to rotate about vertical and horizontal axes and having teeth engageable with the chain to define upper and lower runs and bends or corners in said runs, said sprockets which define bends or corners in the upper run each having axially projecting means for supporting said top carrier plates against tilting while traveling therearound, and track members for supporting the upper and lower runs of the chain while traveling between sprockets.

4. In an endless conveyer, a chain formed of a plurality of top plate links interconnected by connector links, the pivots at the opposite ends of each link being arranged at right angles to each other, each of said top plate links having a pair of upstanding flanges, a top carrier plate mounted on each pair of flanges, sprockets mounted to rotate about vertical and horizontal axes engageable with the chain to define upper and lower runs and bends or corners in said runs, said sprockets which define bends or corners in the upper run each having axially projecting means for supporting said top carrier plates against tilting while traveling therearound, and track members for supporting the upper and lower runs of the chain while traveling between sprockets, said track members for the upper run cooperating with the upstanding flanges of said top plate links for preventing lateral movement of the conveyer.

5. In an endless conveyer, a chain including a plurality of top plate links each of which has a pair of upstanding flanges, a top carrier plate mounted on each pair of flanges, supporting and driving sprockets engageable with the chain, and track members for supporting the runs of the chain while traveling between sprockets, the track members for the load carrying run of the chain cooperating with the upstanding flanges of said top plate links for preventing lateral movement of the conveyer.

6. In an endless conveyer, a plurality of links pivotally connected to permit travel of the conveyer about axes arranged at right angles to each other, each pivotal link connection including a sprocket engaging roller, a top carrier plate connected to alternate links, and sprockets having teeth constructed and arranged to straddle the chain rollers at all of said pivotal connections and to bend the chain about axes arranged at right angles to each other.

7. In an endless conveyer, a chain including a plurality of links pivotally connected to permit travel of the conveyer about axes arranged at right angles to each other, each of said pivotal link connections including a sprocket engaging roller positioned to intercept the center line of the chain, a top carrier plate connected to alternate links, and sprockets having teeth constructed and arranged to straddle the chain rollers at all of said pivotal connections and in the center line of the chain to bend the chain about axes arranged at right angles to each other.

8. In an endless conveyer, the improvement which comprises a top plate link, a top carrier plate rigidly connected to said link, a connector link, a chain pin and bushing pivotal connection between said links with the connection co-axially arranged relative to the top carrier plate but independent of the rigid connection between said plate and its link, and a sprocket engaging roller journaled on the bushing of said pin and bushing connection.

9. In an endless conveyer, a plurality of links pivotally connected to permit travel of the conveyer about axes arranged at right angles to each other, each of said links being stamped from sheet material and shaped to provide two pairs of oppositely directed, parallel headed arms with aligned pitch holes formed in the heads of each pair of arms, the axes of the pitch holes for the pairs of arms being arranged at right angles to each other, sprocket engaging means for pivotally connecting adjacent pairs of arms of adjoining links, one of the arm heads of alternate links having carrier plate mounting means formed thereon, and a top carrier plate connected to each of said mounting means.

10. In an endless conveyer, the improvement which comprises a top plate link formed with a central web and two pairs of headed arms projecting in opposite directions from said web with the said pairs of arms arranged at right angles to each other, the head of one of said arms having a pair of upstanding flanges formed thereon, and a top carrier plate mounted on said flanges.

11. In an endless conveyer, a chain including a plurality of top plate links each of which has top plate mounting means, a top carrier plate mounted on said mounting means of each top plate link, sprockets engageable with the chain, and track means for supporting the runs of the chain while traveling between sprockets, the track means for the load carrying run of the chain cooperating with the top plate mounting means for preventing lateral movement of the chain.

12. In an endless conveyer, a chain formed of a plurality of top plate links interconnected by connector links, the pivots at the opposite ends of each link being arranged at right angles to each other, each of said top plate links having top plate mounting means, a top carrier plate mounted on said mounting means of each top plate link, sprockets mounted to rotate about vertical and horizontal axes engageable with the chain to define upper and lower runs and bends or corners in said runs, said sprockets which define bends or corners in the upper run each having axially projecting means for supporting said top carrier plates against tilting while traveling therearound, and track means for supporting the upper and lower runs of the chain while traveling between sprockets, said track means for the upper run cooperating with the top plate mounting means of said top plate links for preventing lateral movement of the chain.

13. In an endless conveyer, a chain formed of a plurality of top plate links, means for interconnecting said links to permit the chain to travel around horizontal bends or corners, each of said top plate links having top plate mounting means, a top carrier plate mounted on said mounting means of each top plate link, sprockets mounted to rotate about vertical axes engageable with the chain to define said bends or corners, said sprockets each having axially projecting means for supporting said top carrier plates against tilting while traveling therearound, and track means for supporting the chain while traveling between sprockets, said track means cooperating with the top plate mounting means for preventing lateral movement of the chain.

14. In an endless conveyer, the improvement which comprises a top plate link formed with a central web and two pairs of arms projecting in opposite directions from said web with the said pairs of arms arranged at right angles to each other, one of said arms having upstanding means for mounting a top carrier plate in parallelism with but spaced from the arm, and a top carrier plate mounted on said upstanding means.

15. In an endless conveyer, a plurality of links pivotally connected to permit travel of the conveyer about axes arranged at right angles to each other, each of said links being stamped from sheet material and shaped to provide two pairs of oppositely directed, parallel arms with aligned pitch holes formed in each pair of arms, the axes of the pitch holes for the pairs of arms being arranged at right angles to each other, sprocket engaging means for pivotally connecting adjacent pairs of arms of adjoining links, one of the arms of alternate links having a pair of upstanding flanges formed thereon, and a top carrier plate mounted on each pair of flanges.

16. In an endless conveyer, a plurality of links pivotally connected to permit travel of the conveyer about axes arranged at right angles to each other, each pivotal link connection including a sprocket engaging roller, a pair of upstanding flanges formed on every alternate link, a top carrier plate mounted on each pair of flanges, and sprockets having teeth constructed and arranged to straddle the chain rollers at all of said pivotal connections and to bend the chain about axes arranged at right angles to each other.

17. In an endless conveyer, a chain formed of a plurality of top plate links interconnected by connector links, the pivots at the opposite ends of each link being arranged at right angles to each other and each including a sprocket engaging roller, each of said top plate links having a pair of upstanding flanges, a top carrier plate mounted on each pair of flanges, sprockets mounted to rotate about vertical and horizontal axes and having teeth constructed and arranged to straddle the chain rollers at all of said pivots to support the chain in both the upper and lower runs and for bending the runs around corners, and track members for supporting the upper and lower runs of the chain while traveling between sprockets, said track members for the upper run cooperating with the upstanding flanges of said top plate links for preventing lateral movement of the conveyer.

18. In an endless conveyer, a chain formed of a plurality of top plate links interconnected by connector links, the pivots at the opposite ends of each link being arranged at right angles to each other and including a sprocket engaging roller, each of said top plate links having a pair of upstanding flanges, a top carrier plate mounted on each pair of flanges, sprockets mounted to rotate about vertical and horizontal axes and having teeth constructed and arranged to straddle the chain rollers at all of said pivots to support the chain in both the upper and lower runs thereof and for bending the runs around the corners, and track members for supporting the upper and lower runs of the chain while traveling between sprockets, said track members for the upper run cooperating with the upstanding flanges of said top plate links for preventing lateral movement of the conveyer.

RALPH S. DYSON.